2 Sheets—Sheet 1.

J. H. WILSON.

Double Reversible Lathe.

No. 8,999. Reissued Dec. 16, 1879.

Witnesses
Fred. G. Dieterich
George Binkenburg

Inventor
Joseph H. Wilson
By J. P. McLean
Atty

N. PETERS, PHOTO-LITHOGRAPHER, WASHINGTON, D. C.

J. H. WILSON.

Double Reversible Lathe.

No. 8,999. Reissued Dec. 16, 1879.

Witnesses
Fred. G. Dieterich
George Binkenburg

Inventor
Joseph H. Wilson
By James P. McLean
Atty.

N. PETERS, PHOTO-LITHOGRAPHER, WASHINGTON, D. C.

UNITED STATES PATENT OFFICE.

JOSEPH H. WILSON, OF BOSTON, MASSACHUSETTS.

IMPROVEMENT IN DOUBLE REVERSIBLE LATHES.

Specification forming part of Letters Patent No. 179,245, dated June 27, 1876; Reissue No. 8,999, dated December 16, 1879; application filed October 14, 1879.

*To all whom it may concern:*

Be it known that I, JOSEPH H. WILSON, of Boston, in the county of Suffolk and State of Massachusetts, have invented certain new and useful Improvements in Reversible Lathes; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention consists in the combination, with a turning-lathe, of a reversible frame so constructed and arranged that while the cutters are operating upon the article to be molded at one side of the frame a blank or stick of wood may be fixed or centered in the opposite side of the frame, and when the operation of molding is completed the frame may be readily reversed, the molded article removed, and a new piece of wood inserted in the frame, and so the operation is continued without stopping the machine or interrupting the process of molding; and my invention further consists in the several devices by means of which the back-rest is automatically adjusted to bear against the article to be turned during the operation of cutting, thus preventing the vibration of the article or block being molded, and insuring the steadiness of the same while subjected to the action of the revolving cutters.

Figure 1:
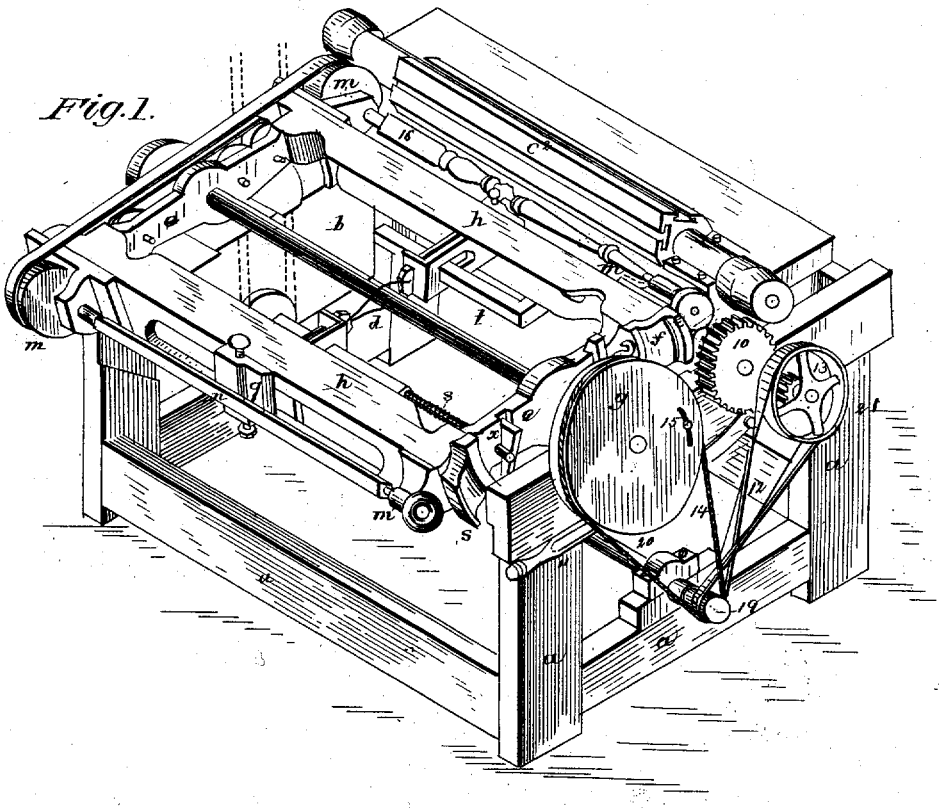
Figure 2:
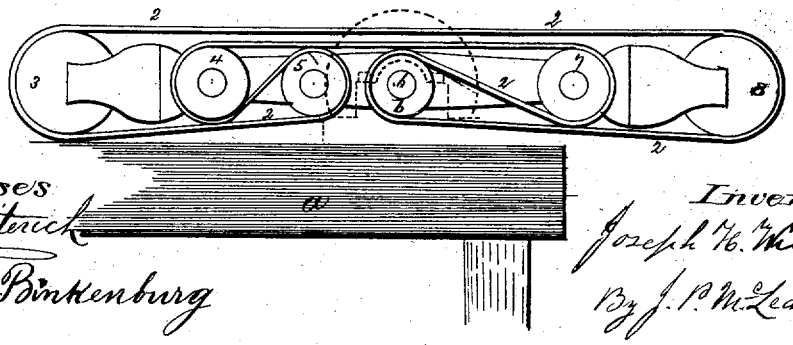
Figure 3:
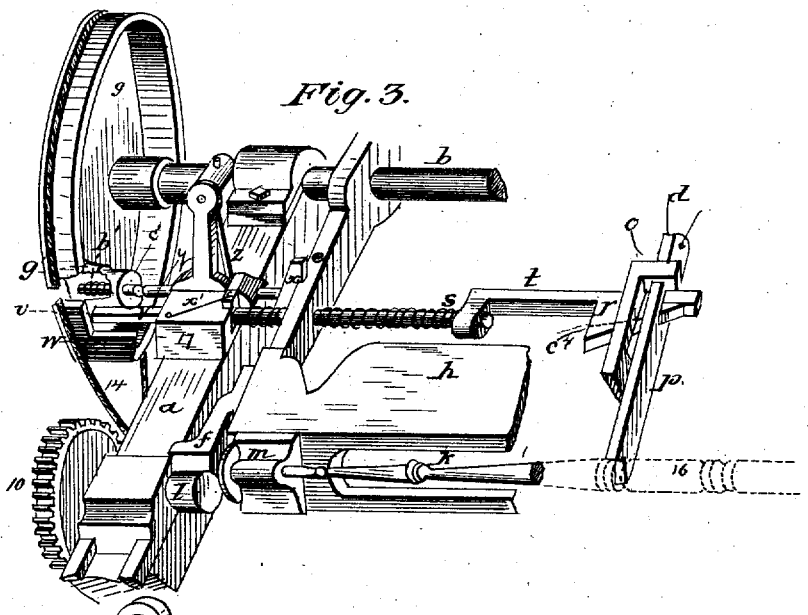
Figure 4:
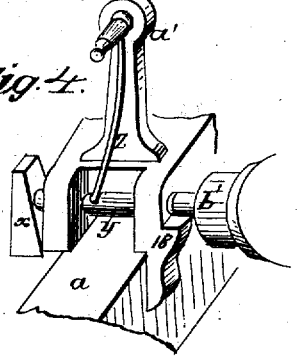
Figure 5:
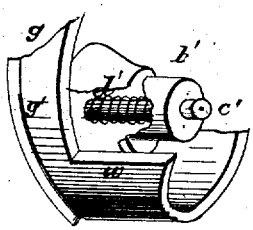

Referring to the drawings, Figure 1 is a perspective view of a machine containing my invention. Fig. 2 shows the belting and pulleys at one end of the reversible frame, by which means the motion of the lathe is continued while the position of the frame is being changed. Figs. 3, 4, and 5 are enlarged views in detail of the devices for operating the back-rest.

Similar letters represent like parts in the different figures.

*a a* represent the frame of the machine, which may be of any suitable size. In this frame is mounted a counter-shaft, *b*. Supported on the shaft is the reversible frame, composed of the arms *e e*, arranged near the ends of the shaft, and the sides *h h*, parallel with the shaft, and connected to the ends of the arms *e e*. The side pieces, *h h*, consist of metal plates, of trough-like form, opening toward the center of the frame, and having a slot, *k*, on their outer sides, extending nearly the whole length of the same. Attached to the ends of the sides *h h* of the frame, at one side, are two convex bearing-surfaces, *f f*, which are made to bear against a friction-pulley, *l*, Figs. 1 and 3.

On the outer sides of the reversible frame are arranged the stocks *m m*, for holding the blank or piece of wood to be molded, the latter being inserted and secured as in an ordinary lathe.

At one side of the machine is arranged an endless belt, 2 2, carried over a series of pulleys, as shown at Fig. 2. Motion is imparted to the belt 2 by the pulley 6, which is attached to the outer end of the counter-shaft *b*.

The belt 2 passes over the top of pulley 6, thence under and around pulley 7, thence around pulley 4 to pulley 5, passing thence to pulley 3, and over pulley 8 back to pulley 6. By this arrangement an uninterrupted and continuous rotation of the piece of wood to be turned into a baluster is maintained, while the reversible frame is turned to remove the finished article and insert a new stick or piece of wood in the stocks.

At or near the center of each of the side pieces, *h h*, of the reversible frame is adjustably arranged a back-rest, *p*, which consists of a metal bar having a notch on its front outer end, which is designed to bear against the article being turned during the process of forming the same into the desired shape. Its projecting end is supported in a head, 9, Fig. 1, which is so connected with the side piece, *h*, as to admit of its being moved laterally to adjust it to any desired position with relation to the article turned.

The rear or inner end of the back-rest *p* is supported in a bent bar, *o*, which is attached to the head 9 so as to move or slide freely in the same. To the rear end of the back-rest is attached a spring, *d*, which serves to draw it back when not forced forward by the mechanism to be described.

Through the bent bar or supporting-piece *o* and the back-rest *p* is a slot, in which is caused to slide a bar, *t*, and attached to this bar is an inclined piece, *r*, which, as it is forced through the slot in the back-rest, causes the latter to move outward, so as to bear against the article turned.

As the first motion of the back-rest is required to be somewhat quickened, the incline on the front portion is greater than that on the rear portion, which may be eased off, as shown by dotted lines in the piece $c^4$, Fig. 3.

On the opposite end of the sliding bar $t$ is a projection, to which is attached a rod or bar, $s$, which passes through the side $e$ of the reversible frame, so as to slide freely in the same. A retracting-spring on the bar $s$ causes the said bar to be forced outward, so that its end will project beyond the side $e$.

Just opposite the end of the portion $u$ of the spring-rod $s$, when the reversible frame is in the position shown in Fig. 3, is a bar, $v$, which is fitted to slide in a block, 17, on the side of the frame $a$, Fig. 3. On the inner side of the sliding bar $v$ is a projection extending above the block, to which is attached an elastic cord, $x'$, for the purpose of keeping the bar forced outward when not actuated by the cam-wheel, and to keep it in contact with the cam portion of the wheel $g$.

Any other form of spring for actuating the bar $v$ which can be conveniently applied may be used instead of the elastic cord $x'$.

On the outer side of the portion $e$ of the reversible frame is attached an inclined block or cam-piece, $x$, as shown in Figs. 1, 3, and 4.

The inclined portion of the cam-piece $x$ is designed to bear against a rod or bar, $y$, which is arranged to slide freely in the block or bearing 17, that holds the sliding rod $v$.

The outer end of the sliding rod $y$ is made to bear against the cam-piece $x$ by means of a spring, $z$, attached to the standard $a'$, as shown at Fig. 4.

The opposite end of the sliding bar $y$ is designed to bear against the end of a spring-bolt, $c'$, which is fitted in a boss, $b'$, on the inner face of the cam-wheel $g$, which is arranged near the large end, $w$, on the cam-wheel, as shown at Fig. 5.

The cam-wheel $g$ has its bearing on the end of the shaft $b$, but does not move with it, motion being imparted to it by means of the band 14, running over the pulley 19, which is attached to the counter-shaft 20.

The position of the spring-bolt $c'$ and boss $b'$ may be adjusted, as occasion requires, by means of a bolt in the slot 15 of the cam-wheel $g$.

On the outer end of the shaft of the friction-pulley $l$ is a cog-wheel, 10, which gears with a pinion, 13, on the shaft of the band-wheel 21, Fig. 1. The end of this shaft has its bearing in the short arm of a lever, 11, the long arm of which extends to the front of the machine, under the control of the operator.

The object of this arrangement is to throw the wheel 10 out of gear and stop the motion of the friction-pulley $l$ in case of any obstruction. Motion is imparted to the gear-wheel 10 from the pinion 13 on the shaft of band-wheel 21. The band 12 passes over pulley 19 on the shaft 20.

At the rear of the machine is arranged the cutter-head $c^2$, provided with grooves to receive the various cutters used for forming balusters or other articles to be molded.

Cutters being in common use for forming wood moldings, the cutter-head does not form any part of this invention, excepting that they form a fundamental part of well-known devices to complete my new mechanical combination to produce in a more perfect form balusters or other articles of lathe-work in a quicker and more workmanlike manner.

On the outer side of the block through which the sliding rod $y$ passes is a shoulder or seat, 18, which serves as a stop to the spring-bolt $c'$.

The operation is as follows: The various running parts being all put in motion, the operator places the block or stick N to be turned in the stocks. The reversible frame $h\ h\ e\ e$ is then turned, the front portion being pushed downward. As this end rises on the opposite side and approaches the cutting cylinder or head, which is provided with suitable knives or cutters to fashion the balusters or other circular forms into shape, they (the forms) revolve in the same direction with the revolving cutters, by which means clear, smooth work is produced. The convex bearing-surface $f$ comes in contact with the friction-pulley $l$, by which means motion is imparted to the reversible frame, the time of contact being sufficiently long to make one revolution of the article being turned and complete the molding of the same. As soon as the convex bearing-surface $f$ comes in contact with the friction-pulley $l$ the cam-piece $x$ bears upon the end of the sliding rod $y$, which in turn forces back the spring-bolt $c'$ into the boss $b'$, so as to pass the shoulder 18, thus allowing the cam-wheel $g$ to rotate, previous to which action the cam-wheel is held stationary, and the belt 14 is allowed to slip on the same.

The object of the shoulder 18 is to hold the cam-wheel in position until it becomes necessary to commence to operate the back-rest. As soon as the spring-bolt $c'$ passes the shoulder 18 the cam-wheel commences to move.

The sliding rod or bar $v$ bears against the narrowest part of the cam-rim $g'$. As the cam-wheel $g$ rotates, the increasing inclination of the cam acts on the sliding bar $v$, and forces it against the spring-rod $s$ and bar $t$, that carries the inclined piece $r$. This incline, entering the slot in the back-rest $p$, forces the latter outward against the article being molded, and gives it a firm steady bearing until the cutting is completed. When the molding is finished the cam-wheel will have made one revolution, and the sliding bar $v$, passing over the large end of the cam $w$, Figs. 3, 4, and 5, releases the spring-rod $u\ s$, thus withdrawing the incline $r$, and the back-rest $p$ is retracted by the elastic cord $x'$.

The entire molding of the article operated upon and the revolution of the cam-wheel occupy the same time that the friction-pulley $b$ is in contact with the convex bearing-surface *f*. The incline *r* may be adjusted to regulate the degree of motion of the back-rest as required.

The reversible frame being hung on a center, it is evident that the article to be molded will pass through the arc of a circle as it is subjected to the action of the cutters. A very high rate of speed is imparted to the cutter-head, the revolutions being about four thousand a minute, while the article being turned makes only fifty revolutions per minute. By this means, and in connection with the back-rest, I am enabled to complete the entire turning of any article with a single cutting-head or cylinder, and I am enabled to turn out a large amount of work by the above process in a very short space of time with perfect uniformity and exactness.

The cutters are secured in the grooves of the cutter-head in the usual form and arranged to suit the different shapes to be turned, whether in the form of a baluster or otherwise.

What I claim as my invention, and desire to protect by Letters Patent of the United States, is—

1. The herein-described turning-lathe, consisting of the reversible frame *a a*, revolving at a slow speed, and of rotary cutters $c^2$, revolving at a high speed, in the same direction with the baluster which is being turned, said reversible frame being composed of side pieces, *e e*, slotted pieces *h h*, mounted on the shaft *b*, and having the stocks *m m* arranged on the outer sides of the said frame, the whole being constructed substantially as described, so that while the cutters are operating upon the article to be turned at one side of the frame a blank may be fixed in the opposite side thereof, in the manner and for the purpose set forth.

2. The combination of the rotating reversible frame, the back-rest *p*, bar *t*, incline *r*, rod *u*, spring *s*, sliding bar *v*, and cam-wheel *g*, the whole being constructed and arranged substantially as described, whereby the reversible frame can be rotated on its axis without interrupting the running of the machine, as and for the purpose specified.

3. In combination with the reversible frame, the endless belt 2, the system of pulleys 3 4 5 6 7 8, or their equivalent, arranged and operating as and for the purpose set forth.

4. The adjustable spring-bolt *c'* on the cam-wheel *g*, in combination with the sliding spring-bar *y* and incline or cam-piece *x* on the reversible frame, as and for the purpose specified.

In testimony that I claim the foregoing I have hereunto set my hand this 6th day of May, 1879.

JOSEPH H. WILSON.

Witnesses:
GEO. V. BROWER,
THEOPH. D. POWELL.